(12) United States Patent
Guisasola

(10) Patent No.: US 12,048,989 B2
(45) Date of Patent: Jul. 30, 2024

(54) DEVICE FOR TENSIONING A CONNECTING ELEMENT

(71) Applicant: Caterpillar Energy Solutions GmbH, Mannheim (DE)

(72) Inventor: Inigo Guisasola, Landau (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 465 days.

(21) Appl. No.: 17/416,625

(22) PCT Filed: Dec. 20, 2019

(86) PCT No.: PCT/EP2019/025472
§ 371 (c)(1),
(2) Date: Jun. 21, 2021

(87) PCT Pub. No.: WO2020/126095
PCT Pub. Date: Jun. 25, 2020

(65) Prior Publication Data
US 2022/0080569 A1    Mar. 17, 2022

(30) Foreign Application Priority Data
Dec. 21, 2018   (GB) .................................... 1820953

(51) Int. Cl.
*B25B 29/02*   (2006.01)
*F16B 31/04*   (2006.01)

(52) U.S. Cl.
CPC ............ *B25B 29/02* (2013.01); *F16B 31/043* (2013.01)

(58) Field of Classification Search
CPC ......... B25B 21/00; B25B 23/04; B25B 23/14; B25B 29/00; B25B 29/02; B23P 19/04;
(Continued)

(56) References Cited

U.S. PATENT DOCUMENTS 3,877,326 A    4/1975   Kock
4,815,344 A *  3/1989   Nemec .................... B25B 23/14
                                                 976/DIG. 175

(Continued)

FOREIGN PATENT DOCUMENTS

CN   204308536 U   5/2015
DE   2328444 A1    1/1975
(Continued)

OTHER PUBLICATIONS

GB Search Report related to GB 1820953.6 reported on May 23, 2019.

(Continued)

*Primary Examiner* — Robert J Scruggs

(57) ABSTRACT

The present invention refers to a device for tensioning a connecting element fastened to a component to be tightened. The device comprises an engagement element connectable to the connecting element, and an actuating unit for translating a rotational movement applied to an actuating element into a translational movement of the engagement element relative to the component. Further, the device comprises a gear unit configured to transform an input torque applied to a transmission input element into an output torque applied to the actuating element which absolute value is higher compared to the input torque.

14 Claims, 1 Drawing Sheet

(58) Field of Classification Search
CPC ....... B23P 19/06; B23P 19/002; B23P 19/067; F15B 20/00; F15B 21/02; F15B 2211/528; F15B 2211/565; F16B 31/043
See application file for complete search history.

(56) References Cited

U.S. PATENT DOCUMENTS

| | | |
|---|---|---|
| 5,025,541 A | 6/1991 | Frizot |
| 7,513,178 B2 | 4/2009 | Hohmann |
| 9,604,329 B2 | 3/2017 | Ono |
| 2013/0056236 A1 | 3/2013 | Morinishi |

FOREIGN PATENT DOCUMENTS

| | | | | |
|---|---|---|---|---|
| DE | 2328444 | * | 6/1975 | |
| EP | 1918072 A2 | | 5/2008 | |
| EP | 2871027 A1 | * | 5/2015 | ............ B25B 21/00 |
| EP | 2871027 A1 | | 5/2015 | |
| EP | 3323555 A1 | | 5/2018 | |
| GB | 1493850 A | | 11/1977 | |
| GB | 2437656 A | | 10/2007 | |
| WO | 2017016654 A1 | | 2/2017 | |
| WO | WO-2017016654 A1 | * | 2/2017 | ............ B25B 29/02 |

OTHER PUBLICATIONS

PCT Search Report related to PCT/EP2019/025472 reported on Mar. 18, 2020.

* cited by examiner

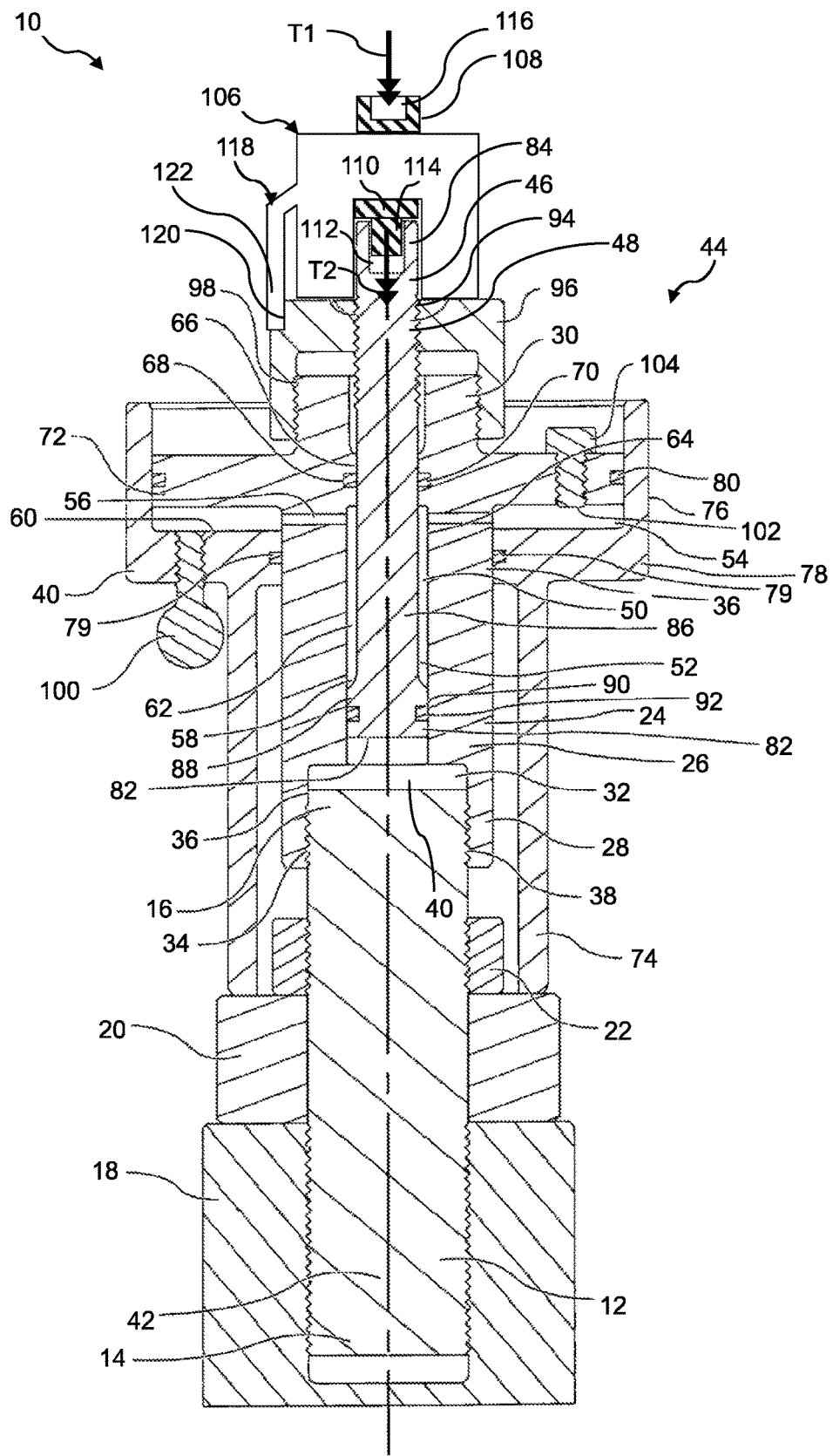

US 12,048,989 B2

DEVICE FOR TENSIONING A CONNECTING ELEMENT

This patent application is a 35 USC § 371 U.S. national stage of International Application No. PCT/EP2019/025472 filed on Dec. 20, 2019, which claims the benefit and priority of Great Britain Application No. 1820953.6 filed on Dec. 21, 2018, the disclosures of which are incorporated in their entirety by reference herein.

TECHNICAL FIELD

The present invention refers to a device for tensioning and/or loosening a tensable connecting element, such as a screw connection, fastened to a component to be tightened or loosened.

TECHNOLOGICAL BACKGROUND

Tensable connecting elements, such as tensable screw connections, for tightening or connecting components are well known. Specifically, for installing such tensable connecting elements, the use of screw tensioning devices is known, for example, in the field of steel constructions and various engine design applications. These screw tensioning devices generally operate based on a torque-free tensioning method, according to which pulling forces are used to lengthen large screws or bolts in an elastic range during installation such that, upon releasing the pulling forces, the connecting elements retract at least partially and thereby apply tensional forces onto the components to be tightened.

For example, in a known use of the screw tensioning devices, at first, a first end of a screw is connected to a first component via a threaded means. Then, a second component to be fastened to the first component is provided such that a threaded rod of the screw extends therethrough. Via a second end of the screw, a nut is placed on the screw so as to be engaged to the threaded rod. Thereafter, the second end of the screw is engaged to the screw tensioning device and a pulling force is applied thereto so as to elastically lengthen the screw. In this lengthened state, the nut is further tightened such that, upon releasing the pulling force applied to the screw, the screw together with the nut apply a tensional force for frictional connecting the first to the second component.

Such a screw tensioning device, for example, is known from US 2018/0215022 A1. In the known device, hydraulically induced pulling forces are used for tensioning a screw connecting element engaged to a fixation element of the device. Specifically, the known device comprises a support element configured to support the fixation element against a component to be tightened during tensioning operation. The fixation element is arranged to be movable relative to the support element so as to apply tension or to remove tension from the screw. Further, a piston is provided which is accommodated and movable within the fixation element along a longitudinal axis of the device. For hydraulically actuating the fixation element, a volume containing a fluid is delimited by and provided in a space between the piston, the fixation element and the support element. In this configuration, the piston is arranged such that a movement thereof relative to the fixation element manipulates the volume and thereby translationally actuates the fixation element relative to the support element. More specifically, the volume comprises two distinct portions, namely a piston portion delimited by the piston and the fixation element and an effective portion delimited by the fixation element and the support element which are fluid-communicatively connected. An effective base area of the piston portion is smaller than an effective base area of the effective portion, each of which is perpendicular to a movement direction of both the piston and the fixation element. By this configuration, the actuating force applied onto the piston is hydraulically transformed into a force acting on the fixation element which is higher compared to that one acting on the piston. By this configuration, an actuating force acting on the piston is transformed into a higher pulling force acting on the screw. In this way, the pulling force for tensioning the screw is generated by multiplying the actuating force applied to the piston.

However, to provide a sufficiently high pulling force, i.e. a sufficiently high multiplication of the actuating force, such screw tensioning devices typically require to be provided with a piston portion of the volume which has a small effective base area and, at the same time, is capable of storing a sufficient high amount of fluid. Accordingly, in order to fulfill these requirements, such screw tensioning devices are usually equipped with an elongated piston portion of the volume which may cause an elongated overall design of the device, i.e. in direction of its longitudinal axis.

SUMMARY OF THE INVENTION

In view of the prior art, it is an objective to provide a new device for tensioning a connecting element. An additional objective may be to provide a device which has a compact design.

This object is solved by means of a device for tensioning a connecting element having the technical features of claim 1. Preferred embodiments are set forth in the present specification, the FIGURES as well as the dependent claims.

Accordingly, a device is provided for tensioning a connecting element fastened to a component to be tightened which comprises an engagement element connectable to the connecting element and an actuating unit for translating a rotational movement applied to an actuating element into a translational movement of the engagement element relative to the component to be tightened. The device comprises a gear unit configured to transform an input torque applied to a transmission input element into an output torque applied to the actuating element which absolute value is higher compared to the input torque.

BRIEF DESCRIPTION OF THE DRAWINGS

The present disclosure will be more readily appreciated by reference to the following detailed description when being considered in connection with the accompanying drawings in which:

FIG. 1 schematically shows a sectional view of a device for tensioning a connecting element.

DETAILED DESCRIPTION OF PREFERRED EMBODIMENTS

In the following, the invention will be explained in more detail with reference to the accompanying FIGURES.

FIG. 1 schematically shows a device 10 for tensioning a connecting element 12 which forms a screw connection. The shown device 10 may be used for tensioning, i.e. preloading, and/or loosening, i.e. untighten, tensable screw connections. In the context of the present disclosure, the term "tensable" refers to a material property indicating that a component, i.e. the connecting element 12, at least partially, is capable of being elastically expanded and thus of storing an amount of elastic energy when being subjected to a tensioning force.

Specifically, the connecting element 12 is provided in the form of a screw comprising a first end 14, an opposed second end 16 and an elastic part positioned between the first end 14 and the second end 16. The elastic part is capable of being elastically lengthened when the connecting element 12 subjected to a pulling force by means of the device 10.

The connecting element 12 is configured for connecting, e.g. form- and/or force-fittingly connecting, a first component 18 to a second component 20. Specifically, the first end 14 of the connecting element 12 is configured to be connected to the first component 18 by means of a threaded engagement, as depicted in FIG. 1. The elastic part of the connecting element 12 extends through the second component 20 such that the second end 16 of the connecting element 12 is positioned on a side of the second component 20 facing away from the first component 18. For connecting the first and the second component 18, 20, a nut 22 is provided which is in threaded engagement with the elastic part of the connecting element 12.

The device 10 comprises an engagement element 24 connectable to the connecting element 12. Specifically, the engagement element 24 includes a cylindrical portion 26 having a first end 28 and a second end 30. At the first end 28, the engagement element 24 includes a cylindrical recess 32 to house the second end 16 of the connecting element 12, while the first end 14 of the connecting element 12 is connected to the first component 18 through the threaded engagement. The recess 32 includes internal threads 34 formed on a side wall 36 of the engagement element 24 to engage with complementary threads 38 formed at the second end 16 of the connecting element 12.

Further, the device 10 comprises a support element 40 configured to support the engagement element 24 against the second component 20. The engagement element 24 is translationally movable relative to the support element 40, i.e. along a longitudinal axis 42 of the device. Specifically, upon translationally moving the engagement element 24 relative to the support element 40, a tensioning force may be applied to or may be removed from the connecting element 12 fixed to the engagement element 24.

The device 10 further comprises an actuating unit 44 for translating a rotational movement applied to an actuating element 46 into a translational movement of the engagement element 24 relative to the first and second component 18, 20 to be tightened and thus relative to the support element 40. In other words, the actuating unit 44 is provided so as to actuate the engagement element 24 relative to the support element 40. In the following, the structure and operation of the actuating unit 44 will be explained in more detail.

The actuating unit 44 is a hydraulically actuated. In other words, a hydraulic fluid is used to transfer motive power so as to move the engagement element 24 relative to the support element 40. For doing so, the actuating unit 44 comprises a piston 48 accommodated within and movable relative to the engagement element 24, i.e. along the longitudinal axis 42. Further, a volume 50 accommodating the fluid is provided which is delimited by the piston 48, the engagement element 24 and the support element 40. In this configuration, the actuating unit 44 is designed such that a translational movement of the piston 48 manipulates the volume 50 and thereby moves the engagement element 24 with respect to the support element 40 so as to apply or remove a tension acting on the connecting element 12 connected to the engagement element 24.

More specifically, the volume 50 comprises two distinct portions, a piston portion 52 delimited by and provided between the piston 48 and the engagement element 24 and an effective portion 54 delimited by and provided between the engagement element 24 and the support element 40. The piston portion 52 and the effective portion 54 are fluid-communicatively connected via two connecting bores 56 provided in the engagement element 24. A base area 58 of the piston portion 52 is provided with an effective cross section that is smaller than an effective cross section of a base area 60 of the effective portion 54. In this context, the "effective cross section" refers to an area that is perpendicular to the longitudinal direction 42 and thus perpendicular to a moving direction of both the piston 48 and the engagement element 24 relative to the support element 40. By this configuration, an actuating force applied onto the piston 48 is hydraulically transformed into a force acting on the engagement element 24 that is higher compared to the actuating force acting on the piston 48.

For accommodating the piston 48, the engagement element 24 further includes a bore 62 extending along the longitudinal axis 42 of the device 10. Specifically, the bore 62 extends from the second end 30 of the cylindrical portion 26 to the recess 32 formed at the first end 28 of the cylindrical portion 26 of the engagement element 24 and is configured to receive the piston 48. A diameter of the bore 62 may be less than the diameter of the recess 32 which thus together form a stepped opening within the engagement element 24. Further, the bore 62 includes a variable diameter along the longitudinal axis 42. In other words, a wall of the engagement element 24 has a variable width along the length of the bore 62 such that the diameter of the bore 62 changes along the length of the bore 62. As depicted in FIG. 1, the bore 62 includes a wider portion 64 and a narrower portion 66. At the wider portion 64, a distance between the piston 48 and the wall of the engagement element 24 is greater than at the narrower portion 66.

As shown in FIG. 1, at the narrower portion 66, the piston 48 contacts the wall of the engagement element 24. The narrower portion 66 includes a groove 68 formed in the wall of the engagement element 24 and extending along a perimeter of the bore 62. A first sealing ring 70 is disposed in the groove 68 to form a seal joint between the piston 48 and the engagement element 24. The first sealing ring 70 is positioned between the piston 48 and the wall of the engagement element 24.

The engagement element 24 also includes a plate 72 extending radially from the cylindrical portion 26 of the engagement element 24. The plate 72 is positioned normal to the longitudinal axis 42 and is proximal to the second end 30 of the engagement element 24. The plate 72 is cylindrical in shape and forms a flange portion in proximity to the second end 30 of the engagement element 24.

The engagement element 24 is received at least partly within the support element 40. As set forth above, the engagement element 24 is arranged and adapted to be moved relative to the support element 40 to apply tension to or remove tension from the connecting element 12. The support element 40 includes a first cylindrical portion 74 and a second cylindrical portion 76 connected to one another by a connection portion 78. The first cylindrical portion 74 forms a lower part of the support element 40 to be positioned on the second component 20. The first cylindrical portion 74 surrounds a part of the connecting element 12, the first end 28 of the engagement element 24 and a portion of the cylindrical portion 26 of the engagement element 24. Specifically, the first cylindrical portion 74 surrounds the portion of the cylindrical portion 26 which is positioned underneath the plate 72 in the illustration depicted in FIG. 1.

The second cylindrical portion 74 is spaced away from the first cylindrical portion 74 by the connection portion 78. The second cylindrical portion 76 surrounds the plate 72 of the engagement element 24 such that an inner surface of the second cylindrical portion 76 contacts an outer surface of the plate 72. In other words, the plate 72 is positioned within the second cylindrical portion 76 of the support element 40 and is configured to move relative to the second cylindrical portion 76.

Further, a third sealing ring 80 is positioned between the inner surface of the second cylindrical portion 76 and the outer surface of the plate 72 to prevent leakage of the fluid accommodated in the volume 50. Specifically, the third sealing ring 80 may be positioned in a groove formed either into the inner surface of the second cylindrical portion 76 or into the outer surface of the plate 72, as depicted in FIG. 1.

As can be gathered from FIG. 1, the first cylindrical portion 74, the second cylindrical portion 76, and the connection portion 78 are hollow cylindrical portions having inner diameters different from each other, thereby forming stepped configurations with each other. The inner diameter of the connection portion 78 is smaller than the inner diameters of both the first cylindrical portion 74 and the second cylindrical portion 76. The connection portion 78 comprises an opening to guide the engagement element 24 within the support element 40, which opening has a diameter slightly larger than the diameter of the portion of the engagement element 24 guided by the support element 40. The connection portion 78 may further define a recess in which a second sealing ring 79 may be disposed for providing a sealing between the engagement element 24 and the connection portion 78.

The plate 72, the connection portion 78, and the second cylindrical portion 76 of the support element 40 together form the effective portion 54 of the volume 50. The effective portion 54 is fluidly connected to the bore 62 in the engagement element 24 via the connecting bores 56. The effective portion 54 is configured to receive the fluid from the piston portion 52 accommodated in the bore 62 of the engagement element 24 due to an axial movement of the piston 48 slidably positioned within the engagement element 24.

In this way, the fluid may move back and forth between the piston portion 52 and the effective portion 54 of the volume 50. During operation, the position of the piston 48 determines how much fluid is displaced from the piston portion 52 to the effective portion 54, and vice versa. As can be gathered from FIG. 1, when the piston 48 is moved in an upward direction, i.e. in a direction facing away from the engagement element 24, the size of the piston portion 52 gets smaller. Accordingly, fluid is displaced therefrom into the effective portion 54 causing an increase of pressure in the effective portion 54 as more and more fluid enters thereinto. This pressure acts on the engagement element 24 which causes it to move in a direction facing away from the support element 40, i.e. along the longitudinal axis 42. This movement induces tensioning and thus lengthening of the connecting element 12. In this tensioned and lengthened state of the connecting element 12, an operator may tighten the nut 22 so as to position the nut 22 closer to the second component 20, i.e. to abut on the second component 20. This may be performed by reaching the nut 22 through openings in the support element 40 with a tool, an end of which may be inserted into the openings at the side of the nut 22 to turn and thus tighten or loosen the nut 22.

The piston 48 has a generally cylindrical shape with a head end 82 and a rod end 84 that are distal to one another and connected by a shaft 86. The head end 82 has a sealing portion 88 that is larger in diameter than the shaft 86. The diameter of sealing portion 88 corresponds to a diameter of the bore 62 in the engagement element 24. The sealing portion 88 comprises a recess 90 that is circular in nature. A fourth sealing ring 92 is provided within the recess 90.

The first to fourth sealing ring 70, 79, 80, 92 may be made from metal, such as iron or steel, ceramics, fibrous materials, elastomer and/or plastic.

The piston 48 further includes a threaded portion 94 that is in threaded engagement with a cap 96 of the engagement element 24. The cap 96 is firmly fixed to the second end 30 of the cylindrical portion 26 by means of a threaded connection 98. Alternatively, the cap 96 may be pressed to the second end 30 of the cylindrical portion 26 of the engagement element 24.

In the shown configuration, the actuating element 46 is formed by the rod end 84 of the piston 48. As the piston 48 and thus the actuating element 46 are connected to the cap 96 by means of a threaded engagement, the actuating unit 44 is designed such that a rotational movement of the actuating element 46 is transformed into a translational movement of the piston 48 relative to the engagement element 24 which manipulates the volume 50 and thereby moves the engagement element 24 with respect to the support element 40. As a result, upon rationally manipulating the actuation element 46, a tensioning or loosening of the connecting element 12 connected to the engagement element 24 is performed by means of the device 10.

Further, the effective portion 54 of the variable volume 50 is fluidly connected to a pressure metering device 100 for determining a pressure of the fluid present in the effective portion 54. A vent opening 102 is arranged in fluid connection with the effective portion 54 to remove any gases therefrom. The vent opening 102 is closed by a screw 104.

The device further comprises a gear unit 106 configured to transform an input torque T1 applied to a transmission input element 108 into an output torque T2 applied to the actuating element 46 of the actuating unit 44, wherein the absolute value of the output torque T2 is higher compared to the input torque T1. As can be gathered from FIG. 1, each of the input and output torque T1, T2 has a direction substantially parallel to the longitudinal axis 42.

For applying the output torque T2 to the actuating element 46 of the actuating unit 44, the actuating element 46 is connected to a transmission output element 110 of the gear unit 106 in a form-fitting manner. Specifically, the actuating element 46 is provided with a recess 112 having a polygonal, i.e. hexagonal profile which is engaged with a complementary connecting rod 114 of the transmission output element 110.

The transmission input element 108 is configured for being releasably connected to a tool operated by an operator, i.e. to a cordless or battery-driven screwdriver. Specifically, the transmission input element 108 may be provided with a further recess 116 having a polygonal, i.e. a hexagonal profile. In this way, the transmission input element 108 constitutes a socket head which is connectable to, for example, a hex key rod of the tool in a form-transmitting manner.

In the shown configuration, the transmission input element 108 is provided at an outer surface of the device 10. In this way, good accessibility of the transmission input element 108 for an operator may be ensured.

Further, the gear unit 106 may comprise a reaction arm 118 for connecting the gear unit 106 to the engagement element 24 in a torque-transmitting manner. The reaction arm 118 is firmly fixed to a housing of the gear unit 106 and is provided such that a translational movement of the reaction arm 106 and thus of the gear unit 106 relative to the engagement element 24 along the longitudinal direction 42 is enabled and a rotational movement of the reaction arm 118 and thus of the gear unit 106 relative to the engagement element 24 is locked. In this way, the gear unit 106 is allowed to move together with the actuating element 46 along the longitudinal direction 42. Alternatively, the reaction arm 118 may be provided such that it is connected or coupled to the support element 40 for connecting the gear unit 106 to the support element 40 in a torque-transmitting manner.

The cap 96, which is firmly fixed to the engagement element 24, is provided with a first coupling section 120 in the form of a connecting groove being designed complementary to a second coupling section 122 in the form of a tongue provided at an end portion of the reaction arm 118. The first coupling section 120 in the form of the groove extends along the longitudinal axis 42. In a state, in which the gear unit 106 is coupled to the engagement element 24 and the actuating unit 44, the first coupling section 120 is engaged with the second coupling section 122 in a form-fitting manner.

In the shown configuration, the gear unit 106 is releasably connected to the engagement element 24 and the actuating unit 44 by means of the form-fitting connection provided between the reaction arm 118 and the engagement element 24, i.e. via the cap 96, as well as by means of the form-fitting connection provided between the transmission output element 110 and the actuating element 46. By such an arrangement, the gear unit 106 may be detached from the device 10 by being displaced in a direction along the longitudinal axis 42 facing away from the device 10.

As can be gathered from FIG. 1, the gear unit 106 is provided such that the direction of the input torque T1 and the direction of the output torque T2 are substantially parallel to one another.

More specifically, the gear unit 106 may comprise a planetary gear which comprises a sun gear firmly connected to the transmission input element 108, at least one planet gear supported by a carrier firmly connected to the transmission output element 110 and a ring gear firmly fixed to the housing and thus to the reaction arm 118 of the gear unit 106. Specifically, the planetary gear may be provided such that the input torque applied to the sun gear via the transmission input element 108 is smaller compared to the output gear applied to the carrier transferred to the actuating element 46 via the transmission output element 110. Accordingly, upon actuation of the gear unit 106, a rotational speed of the transmission input element 108 is higher compared to a rotational speed of the actuating element and the transmission output element 110.

Alternatively, the gear unit may comprise a worm gear. The worm gear may be configured such that the input torque of the gear unit applied to the transmission input element is transformed into a higher output torque applied to the actuating element. Specifically, in the device, the worm gear may comprise a worm screw firmly connected to the transmission input element and a worm wheel connected, i.e. directly or firmly connected, to the actuating element. In this configuration, the gear unit 106 may be provided such that the direction of the input torque T1 and the direction of the output torque T2 are substantially perpendicular to one another.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A device may be provided for tensioning a connecting element fastened to a component to be tightened. The device may comprise an engagement element connectable to the connecting element and an actuating unit for translating a rotational movement applied to an actuating element into a translational movement of the engagement element relative to the component to be tightened. Further, the device may further comprise a gear unit configured to transform an input torque applied to a transmission input element into an output torque applied to the actuating element which absolute value is higher compared to the input torque.

In this configuration, the gear unit serves as a torque or force multiplier. As to substance, the gear unit is configured to increase the input torque applied to the device such that an output torque of the gear unit is generated which is higher compared to the input torque. This output torque may be used to rotationally actuate the actuation element of the actuation unit, thereby translationally moving the engagement element of the device relative to the component to be tightened.

By providing the gear unit, the proposed device may be provided with an actuating unit which, compared to know configurations, may have smaller force multiplier characteristics. As a result, the actuating unit, in particular when being hydraulically actuated, may be provided with a space-saving design as its longitudinal extent may be considerably smaller compared to the known screw tensioning devices.

Generally, the proposed device may be used, for example, in the field of steel constructions and various engine design applications, but is not limited thereto. Rather, the proposed device may be used in any application in which connecting elements are tightened by employing torque-free tensioning methods. In one example, the proposed device may be used to fasten a turbo charger to an engine crank case.

Specifically, the device may be used for tensioning and/or loosening a connecting element. In other words, the device may be used to preload and/or untighten a connecting element. The connecting element may be a tensable connecting element. For example, the connecting element may be or comprise a screw, a bolt and/or any other type of tensable connecting element.

Further, the connecting element to be tensioned and/or loosened by the proposed device may be intended and/or configured to tighten a component to which it is fastened. Alternatively or additionally, the connecting element to be tensioned and/or loosened by the proposed device may be intended and/or configured for connecting, i.e. frictional connecting, a first component to a second component. Accordingly, the device may be configured for tensioning a connecting element for connecting, i.e. frictional connecting, a first component to a second component. For doing so, a first end of the connecting element may be fixed to the first component, i.e. by means of a threaded engagement. For example, the first component may be an engine crank case and the second element may be a turbo charger mount.

As set forth above, the device may comprise the engagement element connectable to the connecting element. In other words, the engagement element is configured for being connected to the connecting element, i.e. in a force- and/or form-fitting manner. For doing so, the engagement element may comprise an engagement section for engaging with the connecting element. Specifically, the engagement section may be engaged with the connecting element by means of a threaded engagement. The engagement section may be provided at an end portion of the engagement element. Further, the engagement section may be configured to engage with a second end of the connecting element arranged opposed to the first end thereof. For example, the engagement section may be provided with a thread designed complementary to a thread formed at the second end of the connecting element.

The device may further comprise a support element configured to support the engagement element against the component to be tightened during tensioning operation of the device. In other words, the support element is configured to, during the tensioning operation of the device, abut on the component to be tightened, i.e. on the first or the second component. In this way, the support element is capable of generating a force, i.e. a reaction force, counteracting the pulling force exerted onto the connecting element connected to the engagement element during tension operation of the device. The device is provided such that the engagement element is translationally movable relative to the support element, i.e. along a longitudinal axis of the device. Upon translationally moving the engagement element relative to the support element, a tensioning force may be applied to or may be removed from the connecting element fixed to the engagement section. Thus, the device may be provided such that the engagement element is translationally movable relative to the support element so as to apply a tension to or to remove a tension from the connecting element.

The actuating unit may be provided for actuating the engagement element, i.e. for translationally moving the engagement element relative to the support element and thus relative to the component to be tightened. For doing so, as set forth above, the actuating unit may comprise the actuating element and may be configured for translating a rotational movement applied to the actuating element into a translational movement of the engagement element relative to the component to be tightened and thus relative to the support element.

The actuating unit may be a hydraulically actuated or a hydraulically driven actuating unit. This means that the actuating unit may use a fluid for actuating the engagement element. In other words, a fluid is used to transfer motive power for the engagement element so as to move the engagement element relative to the component to be tightened and thus relative to the support element.

Specifically, the actuating unit may comprise a piston accommodated within and movable relative to the engagement element, i.e. along the device's longitudinal axis. Further, a volume accommodating a fluid may be provided. The volume may be defined or delimited at least partly by the piston and/or the engagement element and/or the support element. Specifically, the volume may at least partly be provided in a space between the piston and/or the engagement element and/or the support element. In this configuration, the actuating unit may be provided such that a translational movement of the piston manipulates the volume and thereby moves the engagement element with respect to the support element and thus with respect to the component to be tightened.

More specifically, the volume may comprise two distinct portions, namely a piston portion delimited by and provided between the piston and the engagement element and an effective portion delimited by and provided between the engagement element and the support element which are fluid-communicatively connected, i.e. via bores provided in the engagement element. An effective base area of the piston portion may be smaller than an effective base area of the effective portion which may be perpendicular to a movement direction of both the piston and the engagement element, i.e. perpendicular to the device's longitudinal axis. By such an arrangement, the actuating force applied onto the piston may be hydraulically transformed into a force acting on the fixation element which is higher compared to that one acting on the piston. In this way, the actuating unit transforms an actuating force into a pulling force acting on the connecting element which is multiplied compared to the actuating force the piston is exerted to.

Further, in the actuating unit, the actuating element and the piston may be arranged and interlinked to one another such that a rotational movement of the actuating element causes a translational movement of the piston, i.e. along the device's longitudinal axis, which manipulates the volume and thereby moves the engagement element relative to the component.

As set forth above, the device may further comprises the gear unit configured to transform the input torque applied to the transmission input element into the output torque applied to the actuating element which is higher compared to the input torque. For doing so, the actuating element of the actuating unit may be connected to the gear unit, i.e. to a transmission output element of the gear unit, in a torque-transmitting manner. For example, the actuating element may be connected to the gear unit, i.e. to the transmission output element in a form- and/or force-transmitting manner.

The transmission input element may be configured for being releasably connected to a tool. By providing the gear unit, the proposed device may enable that an operator can actuate the device by applying a relatively small actuating torqued onto the transmission input element. In this way, the proposed device may be actuated by means of a cordless or battery-powered screwdriver connectable to the transmission input element.

The gear unit may be provided such that the transmission input element is positioned on an outer surface of the device. Alternatively, the transmission input element may be accessible via an exposed surface of the device. In this way, good accessibility of the transmission input element, which may form an interface for inputting an actuating torque by a user, may be ensured, thereby providing a device with good handling characteristics for an operator.

Further, the gear unit may be connected to the engagement element in a torque-transmitting manner. Further, the gear unit may be connected to the engagement element in a form- and/or force-fitting manner Specifically, the gear unit may be connected to the engagement element such that torques with a direction parallel to the input torque applied to the transmission input element may be transferred between the engagement element and the gear unit. By such a configuration, it can be ensured that reaction forces generated upon transferring and translating the input torque into the output torque are retained by the engagement element.

In a further development, the gear unit may be releasably connected to the engagement element and/or the actuating unit. In this way, the gear unit may be interchangeably used among different devices. Further, the device may be compactly stowed away.

For connecting the gear unit to the engagement element in a torque-transmitting manner, the gear unit may further comprises a reaction arm coupled to the engagement element such that a translational movement of the reaction arm and thus of the gear unit relative to the engagement element is enabled and a rotational movement of the reaction arm and thus of the gear unit relative to the engagement element is locked. In this way, a simple disassembly of the device may be ensured. Further, a translational movement of the gear unit during tensioning operation of the device may be allowed, i.e. induced by actuating the actuating element and thus the piston. Alternatively or additionally, the reaction arm may be coupled to the support element such that a translational movement of the reaction arm and thus of the gear unit relative to the support element is enabled and a rotational movement of the reaction arm and thus of the gear unit relative to the support element is locked.

Specifically, for doing so, the engagement element may be provided with a first coupling section being designed complementary to a second coupling section provided at the reaction arm. In a state, in which the gear unit is coupled to the engagement element and the actuating unit, the first coupling section is engaged with the second coupling section, i.e. to form a form-fitting connection. More specifically, the first coupling section may be provided in the form of a groove or a recess, i.e. which may extend along the device's longitudinal direction and/or parallel to a moving direction of the piston, and the second coupling section may be a tongue designed complementary to the first coupling section, or vice versa.

Further, the gear unit may be provided such that the direction of the input torque of the gear unit applied to the transmission input element and the direction of the output torque of the gear unit applied to the actuating are substantially parallel or perpendicular to one another.

Specifically, the gear unit may comprise a planetary gear, also referred to as an epicyclic gear train or epicyclic gearing. Such planetary gear usually comprises a sun gear, at least one planet gear supported by a carrier and a ring gear. The basic structure and operation of such a planetary gear is well known to a person skilled in the art and is thus not further specified.

The planetary gear may comprise a sun gear connected, i.e. directly or firmly connected, to the transmission input element, at least one planet gear supported by a carrier connected, i.e. directly or firmly connected, to the transmission output element and a ring gear firmly fixed to a housing and/or the reaction arm of the gear unit. In this context, the term "firmly connected" refers to a connection via which a torque is transferred between two components without being increasing or decreasing. The at least one planet gear may comprise a diameter that is smaller than a diameter of the sun gear. Accordingly, the planetary gear may be provided such that the input torque applied to the sun gear via the transmission input element is smaller compared to the output gear applied to the carrier supporting the at least one planet gear which may be transferred to the actuating element via the transmission output element. Alternatively, any other interconnection of the gear unit components may be chosen which enables that the input torque of the gear unit applied to the transmission input element is transformed into a higher output torque applied to the actuating element. Accordingly, upon actuation of the gear unit, a rotational speed of the transmission input element is higher compared to a rotational speed of the actuating element.

Alternatively or additionally, the gear unit may comprise a worm gear. The worm gear may be configured such that the input torque of the gear unit applied to the transmission input element is transformed into a higher output torque applied to the actuating element. The basic structure and operation of such a worm gear is well known to a person skilled in the art and is thus not further specified. Specifically, in the device, the worm gear may comprise a worm screw connected, i.e. directly or firmly connected, to the transmission input element and a worm wheel connected, i.e. directly or firmly connected, to the actuating element.

INDUSTRIAL APPLICABILITY

The proposed device 10 may be used for fastening and/or loosening a tensable connecting element 12 to components to be tightened. The device 10 may be used in different fields of application, such as in steel constructions or engine design applications. In the following, the use of the device 10 for tightening and loosening a screw connection is described in more detail.

To connect a first component 18, e.g. a crank case, to a second component 20, e.g. a turbo charger mount, using a device 10 as shown in FIG. 1, the second component 20 is positioned next to the first component 18 and a connecting element 12 in the form of a screw is guided through a hole in the second component 20 and connected to the first component 18 by means of a threaded connection. As a result, the connecting element 12 extends from a side of the second component 20 which faces away from the first component 18. A nut 22 is screwed on the connecting element 12 from a first end 14 of the connecting element 12 which is arrange opposite to a second end 16 of the connecting element 12 positioned in and fastened to the first component 18.

Then, the device 10 is positioned over the connecting element 12 such that the connecting element 12 is housed by the support element 40. The support element 40 is placed on the second component 20. The engagement element 24 is positioned to introduce the connecting element 12 into the recess 32 to establish a threaded connection between the engagement element 24 and the first end 14 of the connecting element 12.

To apply a tension force to the connecting element 12, the transmission input element 108 is rotationally actuated by using an electric or manual screwdriver. In this way, the output torque T2 is generated which rotationally actuates the actuating element 46 such that the piston 48 is transnationally actuated relative to the engagement element 24 in a direction facing away from the second component 20. By moving the piston 48 in this direction, i.e. upwards, the piston portion 52 of the volume 50 decreases and hydraulic fluid is pushed therefrom into the effective portion 54 of the volume 50 via the connecting bores 56. As a result, the effective portion 54 increases in volume thereby exerting a pressure on the engagement element 24 which moves the same along the longitudinal axis 42 of the device 10 in respect to the support element 40. Accordingly, a distance between the engagement element 24 and the first and the second component 18, 20 increases, thereby tensioning and thus lengthening the connecting element 12.

In this tensioned condition of connecting element 12, for retaining the tension on the connecting element 12, the nut 22 is further tightened on the connecting element until the nut 22 abuts on the second component 20. This is performed by reaching through openings in the support element 40 with a tool, like a stick which end may be inserted in openings at the side of the nut 22 to turn the nut 22 on the connecting element 12 from the side.

For loosening a screw connection formed by the connecting element 12 and the nut 22, which was fastened by device 10 as described above, the support element 40 is positioned around the connecting element 12 on the second component 20. The exposed first end 14 of the connecting element 12 is fixed to the engagement element 24 by introducing the first end 14 of the connecting element in the recess 32 of the engagement element and connecting the first end 14 of the connecting element 12 with the engagement element 24 by a threaded engagement by means of complementary threads formed at the recess 32 of the engagement element 24 and the first end 14 of the connecting element 12.

To apply a tension force to the connecting element 12, the transmission input element 108 is rotationally actuated by using an electric or manual screwdriver. In this way, as described above, the output torque T2 is generated which rotationally actuates the actuating element 46 such that the piston 48 is transnationally actuated relative to the engagement element 24 in a direction facing away from the second component 20. By moving the piston 48 in this direction, i.e. upwards, the piston portion 52 of the volume 50 decreases and hydraulic fluid is pushed therefrom into the effective portion 54 of the volume 50 via the connecting bores 56. As a result, the effective portion 54 increases in volume thereby exerting a pressure on the engagement element 24 which moves the same along the longitudinal axis 42 of the device 10 in respect to the support element 40. Accordingly, a distance between the engagement element 24 and the first and the second component 18, 20 increases, thereby tensioning and thus lengthening the connecting element 12.

In a further step, the nut 22 positioned on the connecting element 12 is loosened using a tool reaching through an opening in the support element 40. After loosening the nut 22, the tension force applied to the connection element 12 is removed by rotationally actuating the transmission input element 108 in a direction that is reversed compared to the rotational actuation of the same for generating the tension force as described above. As a result, the piston 48 is moved towards the second component 20, thereby increasing the piston portion 52 of the volume 50. Further, the effective portion 54 of the volume 50 decreases and the engagement element 24 moves towards the second component 20 and release the tension acting on the connecting element 12. Thereafter, the connecting element 12 is released from the engagement element 24, thereby removing the device 10 from the connecting element 12 and the first and second component 18, 20.

The invention claimed is:

1. A device for tensioning a connecting element fastened to a component to be tightened, comprising an engagement element connectable to the connecting element, and an actuating unit for translating a rotational movement applied to an actuating element into a translational movement of the engagement element relative to the component, wherein
the device further comprises a gear unit configured to transform an input torque applied to a transmission input element into an output torque applied to the actuating element which absolute value is higher compared to the input torque; and
wherein the gear unit comprises a reaction arm coupled to the engagement element such that a transitional movement of the reaction arm relative to the engagement element is enabled and a rotational movement of the reaction arm relative to the engagement element is locked.

2. The device according to claim 1, which further comprises a support element configured to support the engagement element against the component during tensioning operation of the device, wherein in particular the engagement element is translationally movable relative to the support element so as to apply a tension to or to remove a tension from a connecting element connected to the engagement element.

3. The device according to claim 1, in which the actuating unit further comprises a piston accommodated within and movable relative to the engagement element and a volume accommodating a fluid and defined as least partly by the piston and/or the engagement element and/or the support element, wherein the actuating unit is configured to translate a rotational movement of the actuating element into a translational movement of the piston relative to engagement element which manipulates the volume and thereby moves the engagement element relative to the component.

4. The device according to claim 1, wherein the transmission input element is configured to be releasably connected to a tool.

5. The device according to claim 1, wherein the transmission input element is provided at an outer surface of the device.

6. The device according to claim 1, wherein the gear unit is connected to the engagement element in a torque-transmitting manner.

7. Device according to claim 1, wherein the gear unit is releasably connected to the engagement element and/or the actuating unit.

8. The device according to claim 1, wherein the gear unit is connected to the engagement element and/or the actuating unit, in particular the actuating element, in a form-fitting manner.

9. The device according to claim 1, wherein the engagement element comprises a first coupling section which, in a connected state of the gear unit and the engagement element, is configured to engage with a complementary second coupling section provided at the reaction arm.

10. The device according to claim 1, wherein a direction of the input torque (T1) of the gear unit applied to the transmission input element and a direction of the output torque (T2) of the gear unit applied to the actuating element are coaxial to one another.

11. The device according to claim 1, wherein the gear unit comprises a planetary gear.

12. The device according to claim 11, wherein the planetary gear comprises a sun gear connected to the transmission input element, at least one planet gear supported by a carrier connected to a transmission output element and a ring gear fixed to a housing of the gear unit.

13. The device according to claim 1, wherein the gear unit comprises a worm gear.

14. The device according to claim 13, wherein the worm gear comprises a worm screw connected to the transmission input element and a worm wheel connected to the actuating element.

* * * * *